United States Patent [19]

Oleck

[11] Patent Number: 4,808,560

[45] Date of Patent: Feb. 28, 1989

[54] CATALYST FOR SIMULTANEOUS DESULFURIZATION AND DEWAXING OF RESIDUA

[75] Inventor: Stephen M. Oleck, Moorestown, N.J.

[73] Assignee: Mobil Oil Corporation, New York, N.Y.

[21] Appl. No.: 814,090

[22] Filed: Dec. 24, 1985

Related U.S. Application Data

[63] Continuation of Ser. No. 733,410, May 13, 1985, abandoned, which is a continuation of Ser. No. 307,555, Oct. 1, 1981, abandoned.

[51] Int. Cl.$^4$ .......................... B01J 29/30; B01J 29/36
[52] U.S. Cl. .......................................... 502/66; 502/71
[58] Field of Search .............................. 502/66, 71, 74; 208/111

[56] References Cited

U.S. PATENT DOCUMENTS

| | | | |
|---|---|---|---|
| 3,755,138 | 8/1973 | Chen et al. | 208/111 X |
| 3,894,939 | 7/1975 | Garwood et al. | 208/111 |
| 3,968,024 | 7/1976 | Gorring et al. | 208/111 |
| 4,089,775 | 5/1978 | Berger et al. | 208/111 |
| 4,153,540 | 5/1979 | Gorring et al. | 208/89 |
| 4,227,992 | 10/1980 | Garwood et al. | 208/46 |
| 4,263,129 | 4/1981 | Chen et al. | 208/111 |
| 4,305,808 | 12/1981 | Bowes et al. | 252/455 Z |
| 4,458,024 | 7/1984 | Oleck et al. | 502/66 |

*Primary Examiner*—Carl F. Dees
*Attorney, Agent, or Firm*—Alexander J. McKillop; Charles J. Speciale; Dennis P. Santini

[57] ABSTRACT

A catalyst system comprising metal oxide or sulfide hydrogenation component on a ZSM-5 type zeolite support provides excellent hydrowaxing of various residua while simultaneously reducing the sulfur content thereof.

12 Claims, No Drawings

CATALYST FOR SIMULTANEOUS DESULFURIZATION AND DEWAXING OF RESIDUA

This application is a continuation of Ser. No. 733,410, filed May 13, 1985, now abandoned, which in turn is a continuation of Ser. No. 307,555, filed Oct. 1, 1981, now abandoned.

BACKGROUND OF THE INVENTION

1. Field of the Invention

This invention relates to hydroprocessing of petroleum oils, particularly those containing residual hydrocarbon components and having significant sulfur content. More particularly, the invention relates to a novel hydroprocessing catalyst, or catalyst system, for simultaneously reducing the sulfur content and the pour point of heavy petroleum oils containing residual hydrocarbon components. Said novel catalyst comprising hydrogenation components on a support containing a minor amount of a ZSM-5 type zeolite.

2. Description of the Prior Art

It has been conventional in the art to effect sulfur removal from hydrocarbon stocks by subjecting them to treatment with hydrogen, at elevated temperature and pressures, while in contact with a catalyst containing hydrogenating components, either supported or unsupported. Typical of the catalysts suggested by the prior art are those containing Group VIA or Group VIII metals, or their oxides or sulfides, as the hydrogenating components, with such hydrogenating components being supported on a variety of well-known carriers, such as, for example, alumina, kieselguhr, zeolitic molecular sieves and other materials having high surface areas.

Typical of the prior art are U.S. Pat. No. 3,546,103 which teaches hydrodesulfurization with a catalyst of cobalt and molybdenum on an alumina base; U.S. Pat. No. 3,755,145 which describes a process for preparing lube oils characterized by low pour points, it utilizes a catalyst mixture comprising hydrogenation components, a conventional cracking catalyst which can be either crystalline or amorphous and a crystalline aluminosilicate of the ZSM-5 type; and U.S. Pat. No. 3,894,938 relates to the catalytic dewaxing and desulfurization of high pour point, high sulfur gas oils to lower their sulfur content by contacting such oil first with a ZSM-5 type zeolite hydrodewaxing catalyst, which may contain a hydrogenation/dehydrogenation component, in the presence or absence of added hydrogen followed by conventional hydrodesulfurization processing of the dewaxed intermediate.

Although the art of hydroprocessing has been known for a long time and is a highly developed art, there exists today even greater need for efficient and economical means for hydrosulfurizing resids in order to make them more valuable refinery charge stocks. Heavy resids in particular contain large amounts of sulfur and other contaminants which result in undesirable effects such as corrosion, pollution or poisoning of the catalyst. Therefore, the removal or at the least a significant reduction in the amount of such contaminants is essential to the upgrading of such stocks. However, in order to provide a suitable upgrading stock other foreign elements such as metals, nitrogen, oxygen and halogen material also need to be removed from the residua. Typically the severe conditions of prior art hydrodesulfurization processes employ temperatures in the range of about 400°–900° F. or more, pressures of about 500 to 3000 psig and LHSV of about 0.2 to about 5 and are simply uneconomical and in their own right create additional problems. None of the prior art mentioned above nor any prior art known to applicant discloses a catalyst which is capable of simultaneously hydrodewaxing and hydrodesulfurizing heavy residual petroleum stocks.

SUMMARY OF THE INVENTION

The invention in accordance with the present specification is directed to a hydrotreating catalyst consisting essentially of metal oxides or sulfides of Group VIA or VIII of the Periodic Table or mixtures thereof impregnated on a base consisting essentially of a ZSM-5 type crystalline zeolite, admixed with alumina, silica or mixtures of silica and alumina. The mixtures referred to above include mixtures between Groups VIA and VIII and from within Group VIII. The amounts of the oxides in the catalyst composition range from about 1 to 10% of Group VIII oxide or sulfide and from about 2% to about 20% of the Group VIA oxide or sulfide. The preferred amount of Group VIII metal in elemental, oxide or sulfide form in the catalyst composition is between 2% and 10%. The preferred amount of Group VIA metal in elemental, oxide or sulfide form is between 5% and 20%. The amounts of metal, oxide or sulfide components are given in percent by weight of the catalyst on a dry basis. As provided herein, the base upon which the Groups VIA, or VIII metals, metal oxides or sulfides are impregnated provide a hydrotreating catalyst composition consisting essentially of ZSM-5 type zeolite composited with alumina or silica, etc. The amount of ZSM-5 type zeolite in the catalyst composition is from about 1 to 80% and preferably, 5–30%. The amount of alumina, silica or alumina-silica mixture in the composition is from about 99% to 20%, preferably 95–70%. It is quite important to limit the ZSM-5 content of the catalyst (or the catalyst system) to that required to efficiently produce the desired dewaxing of the stock being hydrotreated, because beyond that limit the catalyst produces no more useful dewaxing but negatively affects desulfurization, illustrated below.

The catalyst in accordance with the present invention by virtue of this novel combination of catalytic materials provides for simultaneously hydrodesulfurizing and hydrodewaxing petroleum residua.

DESCRIPTION OF SPECIFIC EMBODIMENTS

The catalysts of the present invention are especially useful for residua hydrodesulfurization units where demetalation is not a major concern, yielding a low sulfur product with increased distillate yield. They are also highly useful with heavy stocks such as atmospheric and vacuum residua as well as distillates difficult to hydrodewax with conventional catalysts.

The catalysts embodied herein can be prepared in any conventional manner known to the art. Preferred are catalysts in which the metal components are nickel, cobalt, wolfram and molybdenum or mixtures thereof and, in particular a mixture of nickel oxide and molybdenum oxide, NiO and $MoO_3$, which is well known in the catalytic art. Accordingly, their preparation forms no part of this invention. The catalysts will usually contain, for example, from about 1 to about 10% NiO and from about 2 to about 20% of $MoO_3$ on a dry basis by weight on a ZSM-5 type zeolitic base. The mole ratio of the Group VIII oxide or sulfide to the Group VIA oxide or sulfide is preferably from about 0.25 to about 2.0. The base comprises a ZSM-5 type zeolite defined as below.

The crystalline aluminosilicate zeolites utilized herein are members of a novel class of zeolites that exhibits unusual properties. Although these zeolites have unusually low alumina contents, i.e. high silica to alumina ratios, they are very active even when the silica to alumina ratio exceeds 30. The activity is surprising, since catalytic activity is generally attributed to framework aluminum atoms and/or cations associated with these aluminum atoms. These zeolites retain their crystallinity for long periods in the presence of steam at high temperature which induces irreversible collapse of the framework of other zeolites, e.g. of the X and A type.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminium atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites useful in this invention have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although in some instances excessive puckering of the rings or pore blockage may render these zeolites ineffective. Twelve-membered rings usually do not offer sufficient constraint to produce the advantageous conversions, although the puckered 12-ring structure of TMA offretite shows constrained access. Other 12-ring structures may exist which, due to pore or to other cause, may be operative.

Rather than attempt to judge from crystal structure whether or not a zeolite possess the necessary constrained access to molecules larger than normal paraffins, a simple determination of the "Constraint Index" as herein defined may be made by passing continuously a mixture of an equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° and 950° F. to give an overall conversion between 10% and 60%. The mixture of hydrocarbons is passed at 1 liquid hourly spaced velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (C.I.) values for some typical crystalline aluminosilicates (CAS) zeolites are:

| CAS | C.I. |
| --- | --- |
| ZSM-5 | 8.3 |
| ZSM-11 | 8.7 |
| ZSM-12 | 2 |
| ZSM-35 | 4.5 |
| ZSM-38 | 2 |
| TMA Offretite | 3.7 |
| Beta | 0.6 |
| ZSM-4 | 0.5 |
| H—Zeolon (Mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, whether, admit of the possibility that a given zeolite can be tested under somewhat different conditions and thereby have different Constraint Indexes. Constraint index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12 and therefore within the scope of the novel class of highly siliceous zeolites are those zeolites which, when tested under two or more sets of conditions within the above specified ranges of temperature and conversion, produce a value of the Constraint Index slightly less than 1, e.g. 0.9, or somewhat greater than 12, e.g. 14 or 15, with at least one other value of 1 to 12.

Thus, it should be understood that the Constraint Index value as used herein is an inclusive rather than an exclusive value. That is, a zeolite when tested by any combination of conditions within the testing definition set forth hereinabove and is found to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-35, and ZSM-38, with ZSM-5 being particularly preferred.

In a preferred aspect of this invention, the zeolites hereof are selected as those having a crystal framework density in the dry hydrogen form, of not less than about 1.6 grams per cubic centimeter. The preferred zeolites of this invention are those having a Constraint Index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pycnometer techniques. For example, it may be determined by mercury porosimetry, since mercury will fill the interstices between crystals but will not penetrate the intracrystalline free space. It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

| ZEOLITE | VOID VOLUME | FRAMEWORK DENSITY |
|---|---|---|
| Ferrierite | 0.28 cc/cc | 1.76 g/cc |
| Mordenite | .28 | 1.7 |
| ZSM-5,-11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.57 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5% by weight may be used. Thus, the original alkali metal of the zeolite may be replaced by ion exchange with other suitable ions of Groups I to VIII of the Periodic Table, including, by way of example, nickel, copper, zinc, palladium, calcium or rare earth metals.

In practicing the desired process, it may be desirable to incorporate the above described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix on an anhydrous basis may vary widely, with the zeolite content ranging from between about 1 to about 99% by weight and more usually in the range of about 5 to about 80% by weight of the dry composite.

EXAMPLE 1

This is a prior art, resid hydroprocessing catalyst that is covered under U.S. Pat. Nos. 3,876,523 and 4,082,695. It contains 10 weight % $MoO_3$ and 3½ weight % CoO on a 1/32 inch diameter extruded support. It contains no zeolite.

EXAMPLE 2

This is a commercial residua-hydrodesulfurization catalyst. It typically contains 15 weight % $MoO_3$ and 3 weight % CoO and is in the form of 1/32 inch diameter cylindrical pellets. It contains no zeolite.

EXAMPLE 3

Kaiser substrate alumina, a commercial, alpha alumina monohydrate powder, was mixed with water, extruded to 1/32 inch diameter pellets, dried and calcined at 1000° F. One hundred grams of the calcined pellets were impregnated with 82 ml solution containing 26.8 grams ammonium heptamolybdate, dried, impregnated with 70 ml solution containing 20.4 grams nickel (ous) chloride hexahydrate, dried and recalcined at 1000° F. The composition was 17 weight % $MoO_3$ and 5 weight % CoO. The catalyst contained no zeolite.

Examples 1 to 3 typify prior art catalysts which contain no ZSM-5 type zeolite.

The following examples typify the invention.

EXAMPLE 4

(15% ZSM-5)

Kaiser substrate alumina and dried ZSM-5 crystals were blended in proportions to obtain a composition of 15 weight % ZSM-5 and 85 weight % $Al_2O_3$ on an ignited basis, mixed with water, extruded to 1/32 inch diameter pellets, dried and calcined at 1000° F. in flowing introgen and then flowing air. The calcined extrudate was exchanged with ammonium nitrate solution to low sodium and dried. The product had a 86.4 weight % solids content and 0.01 weight % sodium.

One hundred gram portions of the above were impregnated with 65 ml solution containing 23.1 grams ammonium heptamolybdate, dried, impregnated with 53 ml solution containing 17.6 grams nickel (ous) chloride hexahydrate, dried and recalcined at 1000° F. The composition was 17 weight % $MoO_3$ and 5 weight % NiO.

EXAMPLE 5

(30% ZSM-5)

Preparation of the extrudate was similar to that of Example 4 with the exception that the composition was 30 weight % ZSM-5 and 70 weight % $Al_2O_3$. A portion of the dried, ammonium nitrate exchanged extrudate was set aside for the catalyst of Example 6.

A 17 weight % $MoO_3$-5 weight % NiO catalyst was prepared by the same procedure as the catalyst of Example 4.

EXAMPLE 6

(30% ZSM-5)

The dried, ammonium nitrate exchanged extrudate from Example 5 was calcined at 1000° F. in flowing air. A 17 weight % $MoO_3$-5 weight % NiO catalyst was prepared by the same procedure as that of the catalyst of Example 4.

EXAMPLE 7

(65% ZSM-5)

Preparation of the extrudate was similar to that of Example 4, except that the composition on an ignited basis was 65 weight % ZSM-5 and 35 weight % $Al_2O_3$. A 17 weight % $MoO_3$-5 weight % NiO catalyst was prepared by the same procedure as the catalyst of Example 4.

The properties of these catalysts are shown in Table 1.

TABLE 1

| | PROPERTIES OF CATALYSTS OF EXAMPLES | | | | | | | |
|---|---|---|---|---|---|---|---|---|
| EXAMPLE | 1 | 2 | 3 | 4 | 5 | 6 | 7 | 13 |
| ZSM-5 Content | | | | | | | | |
| % of Support | 0 | 0 | 0 | 15 | 30 | 30 | 65 | 0 |
| Density, g/cc | | | | | | | | |
| Packed | 0.74 | 0.82 | 0.67 | 0.67 | 0.62 | 0.64 | 0.74 | — |
| Particle | 1.23 | 1.20 | 1.19 | 1.14 | 1.15 | 1.16 | 1.16 | — |
| Real | 3.66 | 3.45 | 3.62 | 3.49 | 3.30 | 3.36 | 2.89 | — |
| Pore Volume, cc/g | 0.538 | 0.542 | 0.566 | 0.590 | 0.567 | 0.566 | 0.516 | 0.513 |
| Surface Area, $m^2/g$ | 103 | 270 | 183 | 199 | 227 | 224 | 276 | 225 |
| Av. Pore Diameter, Angstroms | 209 | 80 | 124 | 119 | 100 | 101 | 75 | 80 |
| Pore Volume Distribution[1] | | | | | | | | |
| % in pores of | | | | | | | | |
| 0–30 A Diameter | 11 | 12 | 5 | 14 | 13 | 14 | 32 | 1 |
| 30–50 A Diameter | 1 | } 85 | 8 | 3 | 5 | 6 | 9 | } 83 |
| 50–80 A Diameter | 2 | | 17 | 13 | 17 | 17 | 8 | |
| 80–100 A Diameter | 5 | 1 | 9 | 8 | 10 | 9 | 3 | 6 |
| 100–150 A Diameter | 20 | 1 | 28 | 27 | 31 | 31 | 7 | } 3 |
| 150–200 A Diameter | 54 | 0 | 25 | 31 | 15 | 14 | 4 | |
| 200–300 A Diameter | 2 | 0 | 3 | 2 | 5 | 5 | 5 | 0 |

TABLE 1-continued

| PROPERTIES OF CATALYSTS OF EXAMPLES | | | | | | | | |
|---|---|---|---|---|---|---|---|---|
| EXAMPLE | 1 | 2 | 3 | 4 | 5 | 6 | 7 | 13 |
| 300+ A Diameter | 5 | 1 | 5 | 2 | 4 | 4 | 32 | 2 |

(1)30 Angstroms + distribution determined by mercury porosimetry on basis of 130° contact angle and 474 Dynes/cm surface tension.

EXAMPLE 8

The catalysts of Examples 1–7 were used for hydroprocessing Lagomedio atmospheric residuum in a batch, one-liter shaker-bomb reactor at 2000 psig, 750° F., 80 minutes and 20:1 oil-to-catalyst ratio by weight. This shaker bomb unit is described in Ind. Eng. Chem. 50, 47 (1956) by J. W. Payne, C. W. Streed, and E. R. Kent. The charge stock is characterized as:

| | |
|---|---|
| API Gravity | 18.1 |
| Pour Point | 75° F. |
| Sulfur | 1.99 wt. % |
| Hydrogen | 11.87 wt. % |
| Nickel | 21 ppm |
| Vanadium | 220 ppm |
| CCR | 7.8 wt. % |

The results obtained from these tests are shown in Table 2.

TABLE 2

| HYDROTREATING LAGOMEDIO ATMOSPHERIC RESIDUA | | | | | | | |
|---|---|---|---|---|---|---|---|
| Example No. | 1 | 2 | 3 | 4 | 5 | 6 | 7 |
| ZSM-5 Content % of Support | 0 | 0 | 0 | 15 | 30 | 30 | 65 |
| Properties of Liquid Product | | | | | | | |
| Sulfur, wt. % | 1.27 | 1.09 | 0.85 | 0.93 | 1.05 | 1.13 | 1.75 |
| Pour Point, °F. | 55 | 65 | 65 | 10 | −10 | −10 | −5 |
| Sulfur Removal, % | 36 | 45 | 57 | 53 | 47 | 43 | 12 |
| Pour Point Reduction, °F. | 20 | 10 | 10 | 75 | 85 | 85 | 80 |

The catalysts prepared in accordance herewith with ZSM-5 zeolite reduced the pour point of the residuum sharply below those obtained with the conventional hydroprocessing catalysts of Examples 1–3 which contains no ZSM-5 and at the same time were just as effective for reducing sulfur. The catalysts containing 15–30% ZSM-5 desulfurize the atmospheric residuum as well as the commercial desulfurization catalyst of Example 2 and also provide the necessary dewaxing activity, as shown by pour point reduction.

With catalysts containing beyond 30% ZSM-5 little or no more additional pour point reduction is realized with this stock, while desulfurization declined below that produced with the commercial catalysts.

However, catalysts, of the composition in accordance with the invention containing the larger amounts of ZSM-5 may be used in two or more stage systems as described in Example 13.

The hydrogenation function, attributable to the nickel (or cobalt), and molybdenum is also needed in the catalyst. A catalyst containing 65% ZSM-5, but no NiMO or CoMo was tested similarly. Product pour point was −5° F., indicating high dewaxing activity; but the sulfur level was 2.37 wt. %, indicating no reduction in sulfur but also an increase in sulfur content because of loss of light products.

EXAMPLE 9

Two catalysts were used to hydroprocess a North Slope vacuum residuum in the same shaker bomb unit at 2200 psig, 750° F., 160 minutes and an oil-to-catalyst weight ratio of 10. Those catalysts used were catalysts in accordance with the invention, Example 5, and a catalyst, Example 9, used commercially for hydrodewaxing distillate fuels. This catalyst (Example 9) contained 65% ZSM-5 zeolite and 35% $Al_2O_3$ and also 1.0 weight percent nickel which was added by exchanging the extrudate with a nickel salt solution. The results are:

| | Product Properties | |
|---|---|---|
| Example | Pour Point, °F. | Sulfur, wt. % |
| (Charge Oil) | >115 | 2.10 |
| 5 | 25 | 0.39 |
| 9 | 60 | 1.37 |

The catalyst containing nickel and molybdenum and only 30% ZSM-5 was much more effective for dewaxing than the Example 9 catalyst containing much more (65%) ZSM-5 zeolite but only 1% nickel by exchange. These catalysts were also much more effective for desulfurization.

EXAMPLE 10

The catalyst of Example 5 was also used in a similar run as in Example 9 with North Slope vacuum residuum except that pressure was only 500 psig, which is more typical of distillate hydrodewaxing. The results were:

| | % ZSM-5 | Product Properties | |
|---|---|---|---|
| Example | In Support | Pour Point °F. | Sulfur wt. % |
| (Charge Oil) | — | >115 | 2.10 |
| 5 | 30 | 30 | 0.88 |

The results show that the catalyst of the present invention is effective at this low pressure with a reduction in pour point of greater than 85° F. and in sulfur of 58%.

The following examples involve hydroprocessing an Arab light atmospheric residuum in trickle-bed reactors at conventional resid desulfurization conditions (2000 psig, 0.5 LHSV, 725° F., 2500 SCF $H_2$/B). The purpose was to produce a low pour point, low sulfur 650°–775° F. distillate fraction which could be blended into the distillate pool. The results show that this can be accomplished with the novel catalyst described herein, but not with conventional catalyst. Target specifications for products were:

| Fraction | Sulfur, wt. % | Pour Point, °F. |
|---|---|---|
| 650–775°F. | ≦0.25 | ≦0 |
| 775° F.+ | ≦0.5 | — |

The Arab Light atmospheric residuum was characterized as follows:

| Fraction | Whole | C$_5$–380° F. | 380–650° F. | 650–775° F. | 775° F.+ |
|---|---|---|---|---|---|
| Yield, wt. % | 100 | 0.8 | 20.0 | 16.7 | 62.5 |
| Properties | | | | | |
| API Gravity | 19.8 | — | 39.5 | 26.0 | 14.0 |
| Sulfur, wt. % | 2.89 | — | 0.72 | 2.2 | 3.3 |
| Pour Point, °F. | — | — | −15 | 60 | 45 |
| Hydrogen, wt. % | 11.78 | — | — | 11.95 | — |
| Nitrogen, ppm | 1400 | — | — | — | 2200 |
| Vanadium, ppm | 28 | — | — | — | — |
| Nickel, ppm | 6 | — | — | — | — |

EXAMPLE 11

The results for conventional hydroprocessing with a commercial hydrodesulfurization catalyst (Example 2) are shown below as follows:

| Fraction | Whole | C$_5$–380° F. | 380–650° F. | 650–775° F.+ | 775° F. |
|---|---|---|---|---|---|
| Yield, wt. % | 100 | 2.4 | 25.8 | 19.3 | 50.0 |
| Properties | | | | | |
| API Gravity | 29.8 | — | 34.5 | 31.0 | 21.9 |
| Sulfur, wt. % | 0.30 | — | 0.002 | 0.006 | 0.35 |
| Pour Point, °F. | — | — | 5 | 55 | 30 |
| Hydrogen, wt. % | 12.80 | — | 13.49 | 12.80 | |
| Nitrogen, ppm | 600 | — | 24 | 110 | 900 |

Although the 650°–775° F. fraction from this conventional hydrodesulfurization would meet sulfur specification, it is waxy (greater than 50° F. pour point) and cannot be considered for blending in the distillate pool. It is therefore marketed as heavy fuel.

The gasoline-plus-distillate yield was 28.2 wt. % (2.4+25.8 wt. %), compared to 20.8 wt. % (0.8+20.0 wt. %) in the charge.

EXAMPLE 12

The same hydroprocessing with the instant catalyst of Example 5 produces the following results:

| Fraction | Liquid Product | C$_5$–380° F. | 380–650° F. | 650–775° F. | 775° F.+ |
|---|---|---|---|---|---|
| Yield, wt. % | — | 7.8 | 15.6 | 14.6 | 53.3 |
| Properties | | | | | |
| API Gravity | 26.5 | — | 30.8 | 26.6 | 18.4 |
| Sulfur | 0.60 | — | 0.025 | 0.17 | 0.92 |
| Pour Point, °F. | — | — | −65 | −65 | 20 |
| Hydrogen, wt. % | 12.40 | — | 12.69 | 12.68 | 11.80 |
| Nitrogen, ppm | 1000 | — | 34 | 200 | 1700 |

Hydroprocessing with the instant catalyst produces a low sulfur, low pour point 650°–775° F. fraction which means it can be included in the distillate pool. Thus, the gasoline plus distillate yield is now 38.0 wt. % compared to 28.2 wt. % for conventional hydrodesulfurization. However, the 0.92 weight percent sulfur content of the 775° F.+ fraction is considerably above the specified target of ≦0.5 weight percent.

EXAMPLE 13

This example illustrates hydroprocessing catalysts of the present invention which may be used simultaneously with known hydrodesulfurizing catalysts in a dual catalyst system to produce a 650°–775° F. fraction that is acceptable for the distillate pool and lower in sulfur in the 775° F.+ fraction. This dual catalyst system comprised 50% by weight of the catalyst of Example 5 over 50% of the catalyst of Example 13 (a commercial nickel-molybdenum alumina hydrodesulfurization catalyst; see Table 1 for properties). The results are as follows:

| Fraction | Liquid Product | C$_5$–380° F. | 380–650° F. | 650–775° F. | 775° F.+ |
|---|---|---|---|---|---|
| Yield, wt. % | — | 9.0 | 19.3 | 15.9 | 48.9 |
| Properties | | | | | |
| API Gravity | 28.8 | — | 33.2 | 27.9 | 20.1 |
| Sulfur, wt. % | 0.28 | — | 0.006 | 0.06 | 0.35 |
| Pour Point, °F. | — | — | 20 | 0 | 5 |
| Hydrogen, wt. % | 12.90 | — | 13.18 | 12.98 | 12.47 |
| Nitrogen, ppm | 700 | — | 25 | 140 | 1100 |

In Example 13, the 650°–775° F. fraction has a low sulfur content (0.06 wt. %) and low pour point (0° F.) and is suitable for inclusion in the distillate pool. The total gasoline-plus-distillate yield, therefore, becomes 44.2 wt. % compared to 28.2 for conventional hydroprocessing as illustrated by Example 11.

Moreover, this system has upgraded the 775° F.+ fraction to below the target of 0.5 wt. % sulfur.

EXAMPLE 14

This example illustrates hydroprocessing the residua over a combination of commercial desulfurization catalyst (Example 2) and commercial dewaxing catalyst (Example 7). The reactor volume comprised 10% of Example 7 catalyst over 90% of Example 2 catalyst. The results were as follows.

| Fraction | 380–650° F. | 650–775° F. | 775° F.+ |
|---|---|---|---|
| Properties | | | |
| Sulfur, wt. % | 0.029 | 0.08 | 0.57 |
| Pour Point, °F. | −15 | 35 | 35 |

This illustrates that the combination of known commercial desulfurization and dewaxing catalysts fail to produce the desired pour points and sulfur levels in the products.

What is claimed is:

1. A catalytic composition for simultaneously desulfurizing and dewaxing petroleum residua having significant sulfur content, comprising from about 1% to about 10% by weight a nickel or cobalt oxide or sulfide component and from about 2 to about 20% by weight molybdenum, the mole ratio of said nickel or cobalt oxide or sulfide to molybdenum being from about 0.25 to about 2.0, on a base selected from the group consisting of alumina, silica, silica-alumina or mixtures thereof, said base having admixed therewith a crystalline zeolite having the structure of ZSM-5, ZSM-11, ZSM-12, ZSM-35 or ZSM-38, having a crystal framework density of not less than about 1.6 grams/cubic centimeter in an amount equal to between about 15 and less than 65 percent by weight of the catalyst composition, having a surface area between about 199 and about 276 m$^2$/g and having an average pore diameter between about 75 and about 119 Angstroms, for simultaneously reducing sulfur content and pour point of petroleum residua.

2. The catalytic composition as defined in claim 1 wherein said component is a mixture selected from the group consisting of a mixture of NiO and MoO$_3$, and a mixture of CoO and MoO$_3$.

3. The catalytic composition of claim 1 wherein said component is a mixture of NiO and MoO$_3$.

4. The catalytic composition of claim 1 wherein said component is a mixture of CoO and MoO$_3$.

5. The catalytic composition as defined in claim 1 wherein the zeolite is ZSM-5 or HZSM-5.

6. The catalytic composition as defined in claim 1 wherein the zeolite is ZSM-5.

7. The catalytic composition of claim 1 wherein the zeolite is base exchanged or ion exchanged.

8. A simultaneously desulfurizing and dewaxing catalyst system for petroleum residua having significant sulfur content comprising from about 3 to about 7 percent by weight of an oxide or sulfide of nickel or cobalt and about 15 to about 10 percent by weight of MoO$_3$, the mole ratio of said nickel or cobalt oxide or sulfide to molybdenum being from about 0.25 to about 2.0, on a support comprising from about 15 to about 30 percent by weight of a crystalline zeolite having the structure of ZSM-5, ZSM-11, ZSM-12, ZSM-35 or ZSM-38, having a crystal framework density of not less than about 1.6 grams/cubic centimeter and about 85 to about 70 percent by weight of alumina, having a surface area between about 199 and about 276 m$^2$/g and having an average pore diameter between about 75 and about 119 Angstroms, for simultaneously reducing sulfur content and pour point of petroleum residua.

9. A simultaneously desulfurizing and dewaxing catalyst system for petroleum residua having sulfur content of about 2% by weight comprising about 5 percent by weight of an oxide or sulfide of nickel or cobalt and about 17 percent by weight of MoO$_3$, the mole ratio of said nickel or cobalt oxide or said nickel or cobalt oxide or sulfide to molybdenum being from about 0.25 to about 2.0, on a support comprising from about 15 to about 30 percent by weight of support of ZSM-5 zeolite, having a crystal framework density of not less than about 1.6 grams/cubic centimeter and about 85 to about 70 percent by weight of alumina, having a surface area between about 199 and about 276 m$^2$/g and having an average pore diameter between about 75 and about 119 Angstroms, for simultaneously reducing sulfur content, being less than about 0.25 percent by weight for a 650°–775° F. fraction, and pour point, being less than about 0° F. for the 650°–775° F. fraction of petroleum residua.

10. The catalyst system according to claim 8, further comprising the petroleum residua being North Slope vacuum residuum.

11. The catalyst system according to claim 8, further comprising the petroleum residua being Arab Light, atmospheric residuum.

12. The catalyst system according to claim 8, further comprising reduced sulfur content being less than about 0.25 percent by weight for a 650°–775° F. fraction, and the reduced pour point being less than about 0° F. for the 650°–775° F. fraction.

* * * * *